Patented June 30, 1942

2,288,319

UNITED STATES PATENT OFFICE 2,288,319

POUR INHIBITOR

Louis A. Mikeska, Elizabeth, and Eugene Lieber, Linden, N. J., assignors to Standard Catalytic Company, a corporation of Delaware No Drawing. Application December 3, 1937, Serial No. 177,930

10 Claims. (Cl. 260—592)

The present invention relates to the art of producing a wax modifying agent for use in reducing the pour point of wax containing lubricating oils, in separating wax from oils in any process where it is desirable to produce a fine grained wax instead of large crystals. The process of making the improved modifiers and the products themselves will be fully understood from the following description.

Wax modifying agents are prepared by the condensation of certain paraffinic materials such as for example, chlorinated paraffin wax or the olefins derived from chlorinated wax, with aromatic hydrocarbons such as benzol, naphthalene, anthracene and phenanthrene and the like. The condensation is effected by means of a catalyst of the Friedel-Crafts type, such as aluminum chloride, zinc chloride, iron chloride or the other halides of these metals and boron fluoride. It is preferred to use relatively low temperatures in the condensation, for example, below 300° F. and preferably in range from room temperature to 170° or 180° F.

While the modifiers made in the present manner are excellent products of the kind, it is found that better quality materials can be prepared and yields improved by subjecting the product obtained as above to a secondary treatment with an acyl halide. Any acid halide may be used, for example, acetyl chloride or bromide, but the acyl halides corresponding to higher fatty acids are believed to be as satisfactory, for example, stearyl chloride, oleyl chloride or the chlorides of mixed acids obtained from commercial fats or corresponding to the acids produced by direct oxidation of oils or waxes. The acyl halides of aromatic acids or hydro aromatic acids may also be used, for example, benzoyl chloride, phthalyl chloride or the chlorides corresponding to the naphthenic acids obtained from petroleum. Not only are the mono-basic acyl halides useful but di-basic acyl halides are also to be employed such as phthalyl chlorides mentioned above. Substituted acid chlorides are of particular advantage, for example, chlor acetyl chloride, brom-acetyl chloride, or bromide, and unsaturated acid chloride are useful as well.

The amount of the acyl halide used varies with the type of acyl halide used, the optimum proportion being readily found by trial. The optimum proportion usually varies within a wide range. Within this range an increase in the potency of the product is obtained.

The secondary reaction, that is to say, the condensation with the acid halide is brought about under substantially the same conditions as used in the prior reaction and with the same catalytic agents, but it is found that this reaction proceeds with greater ease than the prior condensation and in general lower temperatures may be used.

After carrying out the initial condensation, the product may be finished just as is now customary, that is, the reaction product may be washed with water or alcohol or alcoholic caustic so as to hydrolyze the catalyst, the metal hydroxide produced by hydrolysis can then be removed by filtration or otherwise and the crude product is recovered as a distillation residue after the removal of unreacted materials and lower molecular weight products boiling up to say, 550 or 600° F. It has been found advantageous, however, to add the acyl halide directly to the total reaction product of the first condensation prior to the hydrolysis step and to continue the reaction under the same condition, providing additional catalyst if necessary. In this manner it is possible to hydrolyze the catalyst only once and to eliminate extra finishing steps. Furthermore, some of the intermediate fractions which would be vaporized on finishing the initial condensation product and which have little or no pour inhibiting potency, are converted into potent materials by the second reaction.

The present product is useful in reducing the pour point of wax containing lubricating oils and for such purpose the material may be added in proportion from say about .02% to 2.5%, but usually not more than 1% is required to reduce the pour point from say 30 to 35° F. to 0° F. or below. When the materials are used to assist the separation of wax from waxy oils, they are added in substantially the same proportions indicated above to the waxy oil which is diluted with a suitable solvent such as naphtha or liquefied normally gaseous hydrocarbons, for example, propane, butane, or their mixtures with ethane, and the diluted material is chilled to a wax solidifying temperature. At this temperature the solid wax is removed from the diluted oil by filtration, sedimentation or centrifugation. Other diluents may be used instead of those mentioned above, for example, low molecular weight alcohols, methyl, ethyl, the propyl or the butyl alcohol preferably in a mixture with naphtha. Low molecular weight ketones such as acetone, methyl, ethyl, and the like may be also used as the diluents. The presence of the wax modifying agent enables one to chill the waxy oil mixture very rapidly and still obtain easily separable wax and likewise produces a rapid settling, compact wax cake.

As an illustration of the product and its use, the following example may be considered:

Example I

A pour point depressant is produced by condensing 100 parts by weight of chlorparaffin (12% chlorine) with 15 parts by weight of naphthalene using 2½ parts by weight of aluminum chloride as the catalyst. The reaction was conducted at a temperature of about 88° F. in the presence of about 87½ parts (based on chlorparaffin) of kerosene as solvent. After a reaction time of 4½ hours the catalyst is hydrolyzed by the addition of an excess of isopropyl alcohol and aqueous caustic soda and the aluminum hydroxide produced by hydrolysis was removed. The product was then distilled to remove the diluent and the unreacted constituents to a temperature of 600° F. with fire and steam. The material recovered as the distillation residue is a wax modifying agent and is referred to here and after as the initial condensation product of Example I.

In subsequent tests, 250 grams of the initial condensation product is recondensed with different amounts of acetyl chloride, using 250 cc. of tetrachloroethane as a solvent medium and different amounts of aluminum chloride as the catalyst. The aluminum chloride is added during the time of 15 to 30 minutes and the temperature in the different tests is 70 to 75 or 125° F. In each case, however, after a reaction time of two to three hours, the product was heated to 125° F. for one hour.

The recondensation product is then diluted with naphtha, washed with aqueous alcohol to hydrolyze the catalyst just as before, and washing is continued until all trace of the acid is removed. The second condensation product is now obtained by distilling this material with fire and steam to 600° F. as before.

In the table below the data is summarized:

| Test | Mols acetyl chloride to 250 gr. of original condensation product | Mols aluminum chloride | Temperature of condensation |
|---|---|---|---|
|  |  |  | °F. |
| 1 | .3 | .11 | 75 |
| 2 | .5 | .28 | 125 |
| 3 | .6 | .11 | 75 |
| 4 | 1.0 | .22 | 125 |

The potency of the "initial condensation product of Example I" is such that .075% reduced the pour point of a waxy lubricating oil having an original pour point of 30° F. to 0° F. The same amount of the product obtained in Test No. 1 in the same mineral oil showed a pour point of 0° F. The same amount of the products of Test No. 2 and No. 3 respectively in the same oil reduced the pour point to —5° F., while the same amount of No. 4 in the same oil gave a pour point of —10° F.

Example II

The following example will illustrate the application of chloro-acetyl chloride to the present invention:

One hundred grams of the "Initial condensation product of Example I" and ten grams of chloro-acetyl chloride were dissolved in 150 cc. of tetrachlorethane (as solvent) and 12 grams of anhydrous AlCl₃ were slowly added while agitating at room temperature. After the addition of the AlCl₃ the reaction mixture was maintained at 125° F. for 90 minutes, with occasional shaking, then diluted with kerosene and neutralized with alcohol and water. The kerosene extract, after washing, was distilled with steam to 600° F. to remove the solvent. 92.7 grams of acetylated product were recovered.

The improved potency of the acetylated product is demonstrated by the following table:

| Per cent concentration of depressor | A. S. T. M. pour point, °F. ||
|---|---|---|
|  | Initial cond. prod. | Chloroacetylated |
| None (original test oil) | Degrees +30 | Degrees +30 |
| 0.075 | 0 | —10 |
| 0.0375 | +15 | +5 |

Example III

The procedure followed in Example II was repeated, except that 5 grams of chloro-acetyl chloride and 100 grams "initial condensation product of Example I" were used and that 6 grams of AlCl₃ were used to effect the condensation.

The following table illustrates the potency data obtained:

| Per cent concentration of depressor | A. S. T. M. pour point, °F. ||
|---|---|---|
|  | Initial cond. prod. | Chloroacetylated |
| None (original test oil) | Degrees +30 | Degrees +30 |
| 0.075 | 0 | —10 |
| 0.0375 | +15 | +5 |

Example IV

The following example will illustrate the application of benzoyl chloride to the present invention.

One hundred grams of the "initial condensation product of Example I" and 10 grams of benzoyl chloride were dissolved in 150 cc. of tetrachlorethane (as solvent) and 10 grams of anhydrous AlCl₃ were slowly added while agitating the mixture at room temperature. The reaction mixture was then allowed to stand at room temperature, with occasional agitation, for 18 hours and then neutralized and the product recovered as already described. 95.3 grams of benzoylated material were obtained.

The potency of the "initial condensation product of Example I" is such that 0.075% reduced the pour point of a waxy lubricating oil having an original pour point of +30° F. to 0° F. The same amount of the "benzoylated product" in the same mineral oil showed a pour point of —5° F.

The present invention is not to be limited to any portion of the method of condensation, nor the use of any particular acyl halide catalyst or mode of operation, but only to the following claims in which it is desired to claim all novelty inherent in the invention.

We claim:

1. The process which comprises condensing an aromatic hydrocarbon with a paraffin wax derivative selected from the group consisting of halogenated paraffin wax and olefins of the type derived therefrom, in the presence of a Friedel- Crafts catalyst at a temperature below about 300° F. to make a high molecular weight wax-aromatic hydrocarbon initial condensation product substantially non-volatile at temperatures up to at least 550° F. and recondensing said wax-aromatic product with a monobasic acyl halide using about 0.25–1.0 gram mol of the latter to each 250 grams of wax-aromatic product, in the presence of a Friedel-Crafts catalyst, hydrolyzing and removing the catalyst and subjecting the condensation product to distillation up to at least 550° F. to obtain as distillation residue a high molecular weight final acylated wax-aromatic hydrocarbon condensation product having pour point reducing properties.

2. Process according to claim 1 carried out by adding the acyl halide directly to the initial condensation reaction mass without removal of the catalyst used in said initial condensation reaction and without separating from said initial condensation reaction mass the product which is substantially non-volatile at temperatures up to about 550° F.

3. Process according to claim 1 in which the acyl halide used is a fatty acid halide.

4. The process which comprises condensing naphthalene with chlorinated paraffin wax in the presence of aluminum chloride as catalyst at a temperature between the approximate limits of room temperature and about 180° F. to make a high molecular weight wax-naphthalene initial condensation product substantially non-volatile at temperatures up to about 550° F. and recondensing said wax-naphthalene product with acetyl chloride, using about 0.5 to 1.0 gram mol of the latter to each 250 grams of wax-naphthalene product, in the presence of aluminum chloride as catalyst and in the presence of tetrachlor ethane as solvent, at a temperature below about 180° F., hydrolyzing and removing the catalyst and subjecting the condensation product to fire and steam distillation up to about 600° F. to obtain as distillation residue a high molecular weight acetylated wax-naphthalene final condensation product having pour point reducing properties.

5. As a new product, a high molecular weight acylated wax-aromatic hydrocarbon condensation product substantially non-volatile at temperatures up to at least 550° F. and having pour point reducing properties, said product resulting from the acylation of a high molecular weight wax-aromatic hydrocarbon condensation product substantially non-volatile at temperatures up to at least 550° F. with a monobasic acyl halide, using about 0.25–1.0 gram mol of the latter per 250 grams of wax-aromatic condensation product, in the presence of a Friedel-Crafts catalyst.

6. Product according to claim 5 in which the wax-aromatic hydrocarbon was derived by condensation of chlorinated paraffin wax with naphthalene.

7. Product according to claim 5 in which the acyl halide used is a fatty acid chloride.

8. Product according to claim 5 in which the acyl halide used is acetyl chloride.

9. Product according to claim 5 in which the acyl halide used is benzoyl chloride.

10. As a new product, a high molecular weight acetylated wax-naphthalene condensation product substantially non-volatile at temperatures up to at least 550° F. and having pour point reducing properties, said product resulting from the acetylation of a high molecular weight wax-naphthalene condensation product substantially non-volatile at temperatures up to at least 550° F. with acetyl chloride, using about 0.5–1.0 gram mol of acetyl chloride per 250 grams of wax-naphthalene condensation product, in the presence of aluminum chloride as catalyst.

LOUIS A. MIKESKA.
EUGENE LIEBER.